United States Patent
Becker et al.

(10) Patent No.: US 10,514,278 B1
(45) Date of Patent: Dec. 24, 2019

(54) PORTABLE METROLOGY STANDS

(71) Applicants: Eric S. Becker, Spirit Lake, IA (US);
Joel R. Gorden, Grain Valley, MO (US)

(72) Inventors: Eric S. Becker, Spirit Lake, IA (US);
Joel R. Gorden, Grain Valley, MO (US)

(73) Assignee: MetrologyWorks, Inc., Buckner, MO (US)

(*) Notice: Subject to any disclaimer, the term of this patent is extended or adjusted under 35 U.S.C. 154(b) by 0 days.

(21) Appl. No.: 16/403,567

(22) Filed: May 5, 2019

Related U.S. Application Data

(63) Continuation-in-part of application No. 16/045,497, filed on Jul. 25, 2018, now abandoned.

(51) Int. Cl.
*F16M 11/34* (2006.01)
*G01D 11/30* (2006.01)

(52) U.S. Cl.
CPC ............ *G01D 11/30* (2013.01); *F16M 11/34* (2013.01)

(58) Field of Classification Search
CPC ........ F16M 11/04; F16M 11/24; F16M 11/16; F16M 11/32; F16M 11/28
USPC ...... 248/688, 461, 469, 125.8, 125.9, 177.1, 248/163.1, 164, 431, 178.1, 186.1, 186.2, 248/187.1, 188.8, 188.9, 161, 407, 410, 248/411, 414
See application file for complete search history.

(56) References Cited

U.S. PATENT DOCUMENTS

| | | | | |
|---|---|---|---|---|
| 2,580,120 | A * | 12/1951 | Mooney | G10G 5/00 84/376 A |
| 5,058,446 | A * | 10/1991 | Guey | F16M 11/18 248/161 |
| 6,260,971 | B1 * | 7/2001 | Cardellini | F16M 11/041 248/177.1 |
| 6,450,464 | B1 * | 9/2002 | Thomas | F16M 11/34 248/163.1 |
| 6,572,060 | B2 * | 6/2003 | Yoon | E06C 1/20 248/163.1 |
| 6,820,844 | B2 * | 11/2004 | Tiffen | F16M 11/32 248/168 |

(Continued)

*Primary Examiner* — Terrell L McKinnon
*Assistant Examiner* — Michael McDuffie
(74) *Attorney, Agent, or Firm* — Jason E. Gorden

(57) ABSTRACT

A portable metrology stand is disclosed that has three upper leg tube assemblies rotatably attached by way of a shoulder member to a base support member. The stand has adjustable hard stops between the shoulder member and the base support structure that prevent the upper leg tube assemblies from rotating outwardly when the hard stops are engaged. The stand also has a partially-threaded center column positioned between the upper leg tube assemblies being rigidly displaced from the center column by struts connected to a clamping collar surrounding the center column, wherein a tensioning nut is threaded downwardly onto an upper portion of the clamping collar, and wherein tightening of the tensioning nut results in driving the clamping collar downwardly thereby pushing bottom portions of the upper leg tube assemblies outwardly and compressing the adjustable hard stops thereby maintaining the upper leg tube assemblies in a state of compression between the struts and the adjustable hard stops.

16 Claims, 10 Drawing Sheets

(56) References Cited

U.S. PATENT DOCUMENTS

| | | | | |
|---|---|---|---|---|
| 7,182,303 B2* | 2/2007 | Speggiorin | ............ | F16B 7/105 |
| | | | | 248/168 |
| 7,988,108 B2* | 8/2011 | Zen | ............ | F16M 11/32 |
| | | | | 248/157 |
| 8,141,827 B2* | 3/2012 | Lin | ............ | F16M 11/242 |
| | | | | 248/170 |
| 8,998,513 B2* | 4/2015 | Li | ............ | G03B 17/561 |
| | | | | 248/125.8 |
| 9,027,895 B2* | 5/2015 | Hunter | ............ | G01C 15/06 |
| | | | | 248/125.8 |
| 2005/0017139 A1* | 1/2005 | Tacklind | ............ | F16M 11/36 |
| | | | | 248/166 |
| 2005/0151036 A1* | 7/2005 | Speggiorin | ............ | F16M 11/14 |
| | | | | 248/177.1 |
| 2007/0131825 A1* | 6/2007 | Skrodzki | ............ | F16M 11/10 |
| | | | | 248/177.1 |
| 2007/0267550 A1* | 11/2007 | Blankenship | ............ | A61G 7/0503 |
| | | | | 248/125.8 |
| 2008/0224000 A1* | 9/2008 | Yang | ............ | F16M 11/16 |
| | | | | 248/188.5 |
| 2010/0224745 A1* | 9/2010 | Orlov | ............ | F16M 7/00 |
| | | | | 248/188.3 |
| 2011/0155886 A1* | 6/2011 | Nakaniwa | ............ | F16M 11/36 |
| | | | | 248/440.1 |
| 2013/0161472 A1* | 6/2013 | Chiu | ............ | F16M 11/18 |
| | | | | 248/422 |
| 2014/0299726 A1* | 10/2014 | Johnson | ............ | F16M 11/32 |
| | | | | 248/168 |
| 2016/0116103 A1* | 4/2016 | Gabrielli | ............ | F16M 11/041 |
| | | | | 248/125.8 |

* cited by examiner

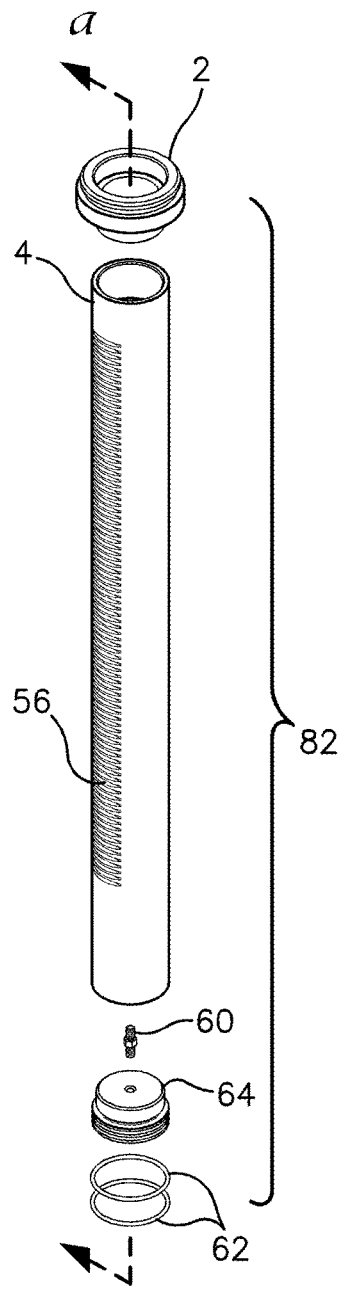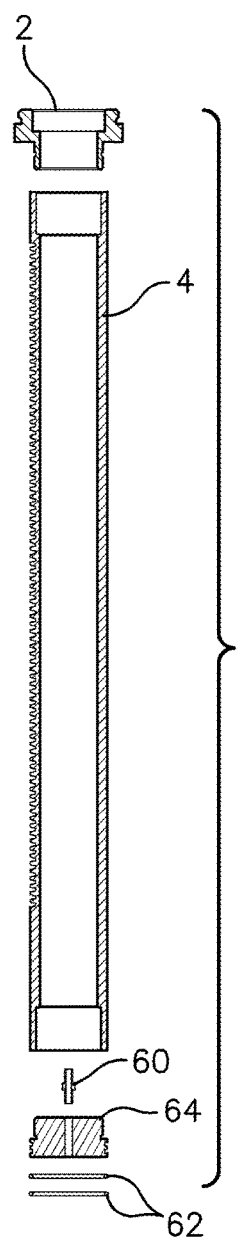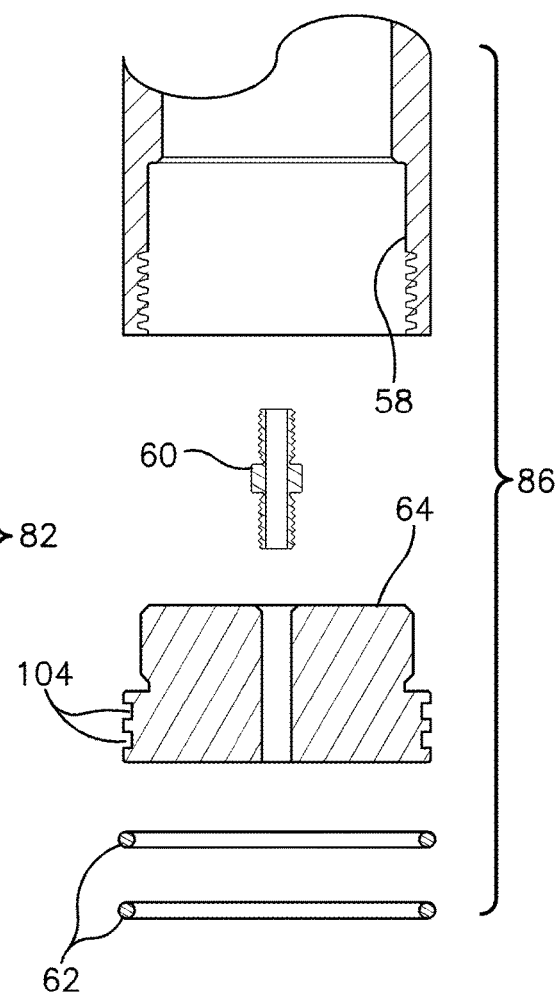
Fig. 7
Fig. 8
Fig. 9

PORTABLE METROLOGY STANDS

This application is a continuation-in-part of U.S. patent application Ser. No. 16/045,497 filed on Jul. 25, 2018 which claims benefit of Provisional Patent Application No. 62/536,963 filed on Jul. 25, 2017.

FIELD

Embodiments described herein relate to portable metrology stands.

BACKGROUND

Portable metrology instruments such as portable coordinate measuring machine ("CMM") arms and laser trackers are dependent on a stable mounting base to achieve their optimal repeatability and accuracy tolerances while in use. Mounting bases can take various forms including heavy rolling stands, magnetic mounts, vacuum mounts and portable folding tripods. As the measurement instruments are portable they are commonly moved to the fixture, machine, or part and set up in proximity to the fixture, machine, or part to be measured. Traditionally, portable metrology tripods have been an oversized version of a camera tripod having a center column that a clamping collar slides up and down on and this clamp is tightened to determine the opening angle of the legs and the overall working height of the tripod. It is generally preferable for a tripod's height and opening angle to not change even the slightest after being setup. Nevertheless, there still is opportunity for the tripod to relax and shift. Any amount of play or movement in the shoulder joints or strut bushings could allow the tripod to change dimensionally. Examples of these types of tripods are produced by Brunson as the M-Series and Moog as the Quickset Gibraltar. Even the slightest dimensional change can significantly affect a sensitive instrument like a laser tracker that is depending on its initial base coordinate system to not move. Once a job is started a default coordinate system is established at the base of the instrument. This internal reference is considered fixed and all points are measured relative to this coordinate system. If an operator is measuring at long distances, 80 meters for example, with a laser tracker and the base of the instrument moves even a few 0.0001" in one or more axes the result of this is amplified over the angle and the distance to the reflector ball probe being used and would cause measurements to be off significantly more than what the tolerance might be on the part being inspected or aligned.

For this reason, some conventional tripods are tensioned to remove as much slack as possible in the joints and bushings. This helps eliminate much of the sag and drift that can be seen by just tightening the clamping collar on the center column. A deficiency associated with conventional tripod designs is that they are normally constrained to one opening angle when they are tensioned. This minimizes the number of applications where one can use a tensioned stand for industrial measurement applications. There can be benefits to the user to be able to operate the stand in a higher stance which provides both additional height and a smaller footprint. When using a laser tracker, which is a line of sight instrument, mounting the laser tracker from a higher vantage point can allow the user to measure a greater area thus minimizing the number of times one needs to move the measurement device saving time on a job. In some instances, such as measuring part of a primary power system during an outage the per-second or per-minute costs can be very significant. Another drawback of some current portable stands is that there is a requirement to have some type of spreader between the legs which is connected to each leg, one at a time like the Brunson Tetralok tripod for example.

Additionally, metrology tripods are commonly made of aluminum and carbon fiber materials and may also contain brass bushings. The combination of these materials and their joints wearing over time will cause the tripod to relax and cause the parts to fit each other loosely causing slack and movement between the parts. If a conventional hard stop is used with tensioning struts, it is possible for the tensioning struts to run out of travel, causing the tripod to lose its ability to be tensioned.

In view of the foregoing, there is a need for a portable metrology stand that can be easily and repeatably tensioned to a very stable configuration, in various positions and even after stretching, bending, and wear of the portable stand and its components.

SUMMARY

Disclosed are various exemplary embodiments of portable metrology stands with at least three legs. In various embodiments, three upper leg assemblies are rigidly, rotatably attached to a base support that prevents the legs from rotating outwardly beyond a defined angle that is determined by adjustable hard stops associated with the base support or shoulder assemblies that are hingedly connected to the base support. The base support is supported by a center column positioned between the three legs, the legs being rigidly displaced from the center column by struts. In one embodiment, a tensioning nut is threaded onto a bottom end of a clamping collar and the tensioning nut is drawn up against a snap-ring in a snap-ring groove in the center column to draw the clamping collar down into the tensioning nut, thereby forcing outwardly the struts which force outwardly the legs of the stand until they become under compression with the associated adjustable hard stops. In an alternative embodiment, a partially-threaded center column is positioned between the upper leg tube assemblies, which are rigidly displaced from the center column by struts connected to a clamping collar surrounding the center column and a tensioning nut is threaded downwardly onto an upper portion of the clamping collar, whereby tightening of the tensioning nut results in driving the clamping collar downwardly thereby pushing bottom portions of the upper leg tube assemblies outwardly and compressing the adjustable hard stops thereby maintaining the upper leg tube assemblies in a state of compression between the struts and the adjustable hard stops. The stand optionally includes telescoping extendable legs and swivel joint feet as well as lower leg support structures that enable rigid extension or shortening of the telescoping legs.

BRIEF DESCRIPTION OF THE DRAWINGS

FIG. 7 is an exemplary perspective view of the moving column assembly 82;

FIG. 8 is an exemplary cross-section of the moving column assembly 82 at section a;

FIG. 9 is an exemplary exploded view of a base cap at the base of the moving column 4;

DETAILED DESCRIPTION

Embodiments will now be explained with reference to the accompanying drawings.

Figure 1:
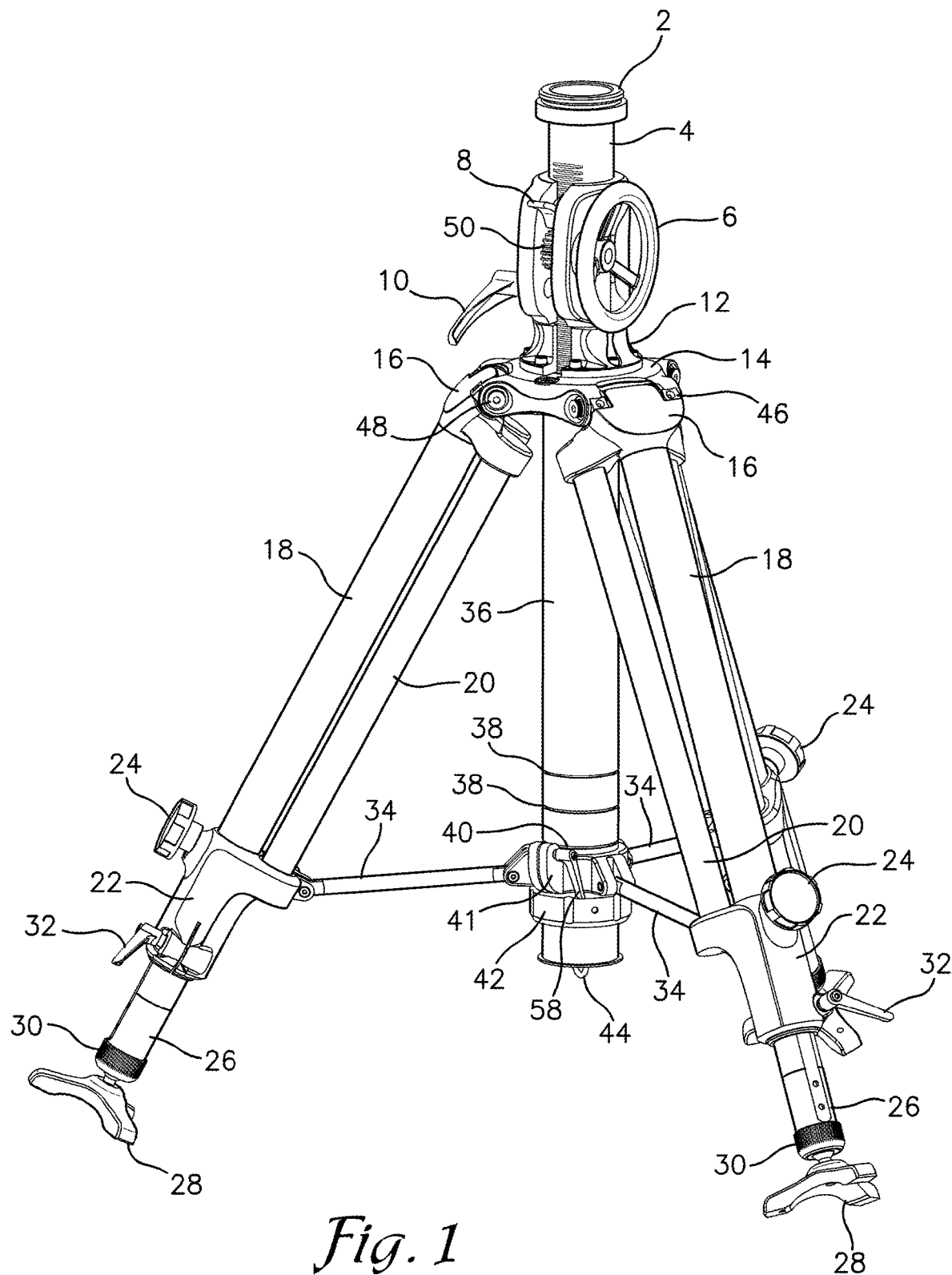
FIG. 1 is a perspective view of an embodiment of a portable stand according to the present teachings.

FIG. 1 is a perspective view of an embodiment of a portable stand according to the present disclosure. Mounting ring 2 is used to mount a portable CMM such as a CMM arm or a laser tracker to a portable stand consistent with the present teachings. In various embodiments moving column 4 can be moved up and down to position the portable CMM as needed for a particular application, such as for example raising a laser tracker to a higher vantage point. The hand wheel 6 is used to move the moving column 4 up and down. The rack lock 8 is used to prevent the moving column 4 from moving downward. In various embodiments, the ring gear 50 works in connection with the rack lock 8 to ratchet the moving column 4 up without allowing it to move down. When the rack lock 8 is disengaged, the moving column 4 can move up and down freely. In various embodiments, an air cylinder (as described in connection with FIGS. 7-9) within center column 36 prevents the moving column 4 from moving downward too quickly or violently. In various embodiments, a tightening lever 10 is provided to provide force and friction against the moving column 4 to prevent it from moving up or down.

In various embodiments, upper support 12 provides a platform for the moving column 4 and the mounting ring 2. In an embodiment, the upper support 12 is a metal casting such as an aluminum or other metal casting or an injection molded rigid plastic molding. A base support 14 made from a similar material to the upper support 12 has a hard stop that prevents shoulder support structures 16 from rotating upward. In various embodiments, the shoulder support structures are metal castings such as aluminum or other metal castings or injection molded rigid plastic moldings. Primary leg tubes 18 can be constructed from any light-weight rigid tubing such as carbon-fiber tubing or aluminum tubing. In various embodiments, the primary leg tube 18 is supplemented by an optional secondary leg tube 20 that can be incorporated to provide additional rigidity and stability. In various embodiments, multiples of optional secondary leg tube 20 are employed. For example, Two leg tubes 20 can be rigidly mounted between the shoulder support 16 and a lower leg support 22.

Lower leg supports 22 are provided to connect extendable legs 26 with primary and secondary legs 18 and 20 respectively. The lower leg supports 22 can be made from a similar cast or injection molded material as upper and base supports 12 and 14. Secondary pressure knobs 24 are threaded into the lower leg supports 22 which prevent movement and wobble of the extendable legs 26. Foot collar clamps 30 are used to attach feet 28 to the extendable legs 26. Lower leg tightening knobs or levers 32 are used to tighten the extendable legs 26 into the lower leg supports 22.

Struts 34 are attached to a clamping collar 40. The clamping collar 40 is optionally tensioned around the center column 36. In various embodiments a snap ring is inserted into one or more of the snap ring grooves 38. Tensioning nut 42 is threaded onto a threaded portion of clamping collar 40 to force the clamping collar 40 downwards into a cavity within the tensioning nut 42.

In an embodiment, an eyebolt 44 is threaded into the center column 36 (optionally by means of center column cap 68 as further described in connection with FIG. 6) so that additional weight can be hung from the eyebolt 44 thus further weighting down the tripod and rendering it more stable.

In various embodiments, a shim 46 can be inserted between the hard stop in the base support 14 and the shoulder support 16 to enable the tripod to have a narrower footprint. In various embodiments shoulder bolt 48 is rotatable with bushings or bearings. In various embodiments, it can have a friction tightening bolt and lever or knob (not shown) to provide further tension at the shoulder joints. Operation of shim 46 is further described in connection with FIGS. 4 and 5.

Figure 2:
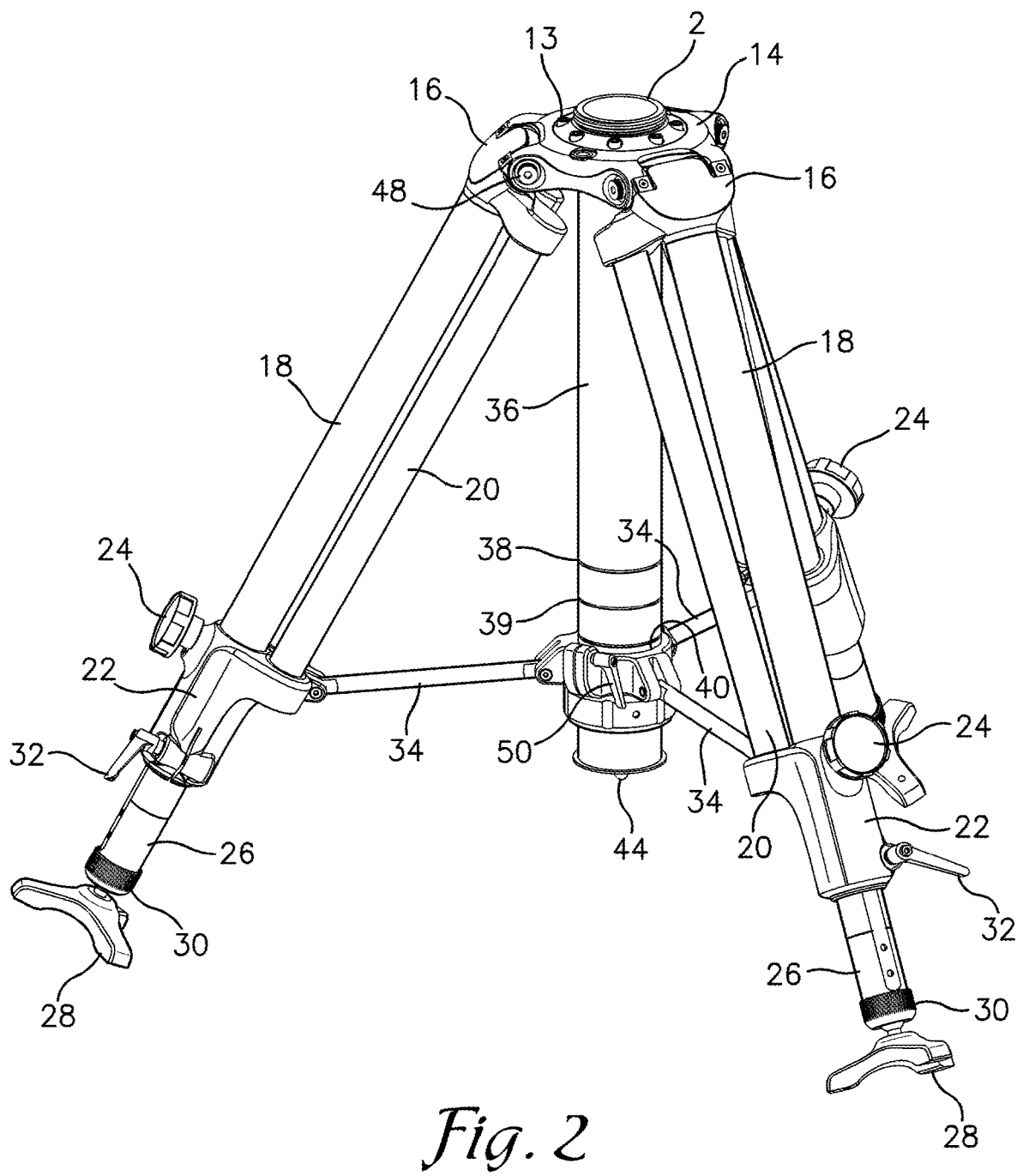
FIG. 2 is a perspective view of an alternative embodiment of a portable stand according to the present teachings.

FIG. 2 is a perspective view of an alternative embodiment of a portable stand according to the present disclosure. In this embodiment, the mounting ring 2 is directly affixed to the base casting 14 using, for example, mounting screws 13. Other components and embodiments are disclosed and function as described in connection with FIG. 1.

Figure 3:
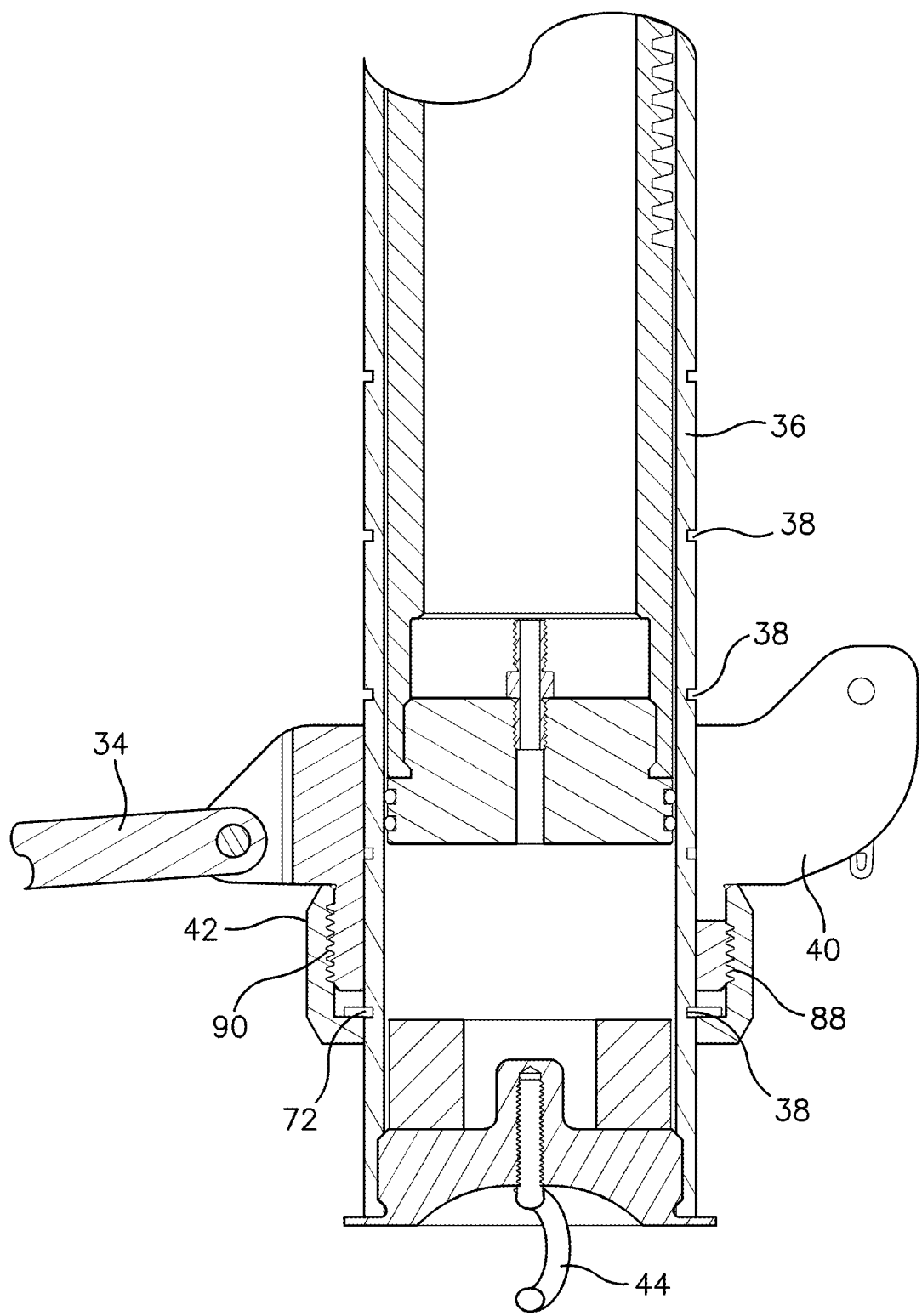
FIG. 3 is a cross-sectional view of a clamping collar in contact with a snap ring in a snap ring groove in a center column according to the present teachings.

FIG. 3 is a cross-sectional view of a clamping collar 40 in contact with a snap ring 72 in a snap ring groove 38 in a center column 36 according to the present disclosure. In this figure, it is shown how the strut 34 is connected to the clamping collar 40 and how the various snap-ring grooves 38 are located within the center column 36. As shown, the snap-ring 72 is snapped into one of the snap-ring grooves 38. Tensioning nut 42, which threads onto the clamping collar 40 is held downwards (or prevented from being drawn upwards along the center column 36) by the snap-ring 72, whereby the tensioning nut 42 pulls the clamping collar 40 downward, thereby putting the struts 34 in tension and pushing outwardly on the legs of the portable stand to put them in tension with the hard stops described in connection with FIGS. 1 and 4-5. In various embodiments, the tensioning nut 42 has interior threads 90 which thread into exterior threads 88 of the clamping collar 40. The threads 88 and 90 are further described in connection with FIG. 6.

Figure 4:
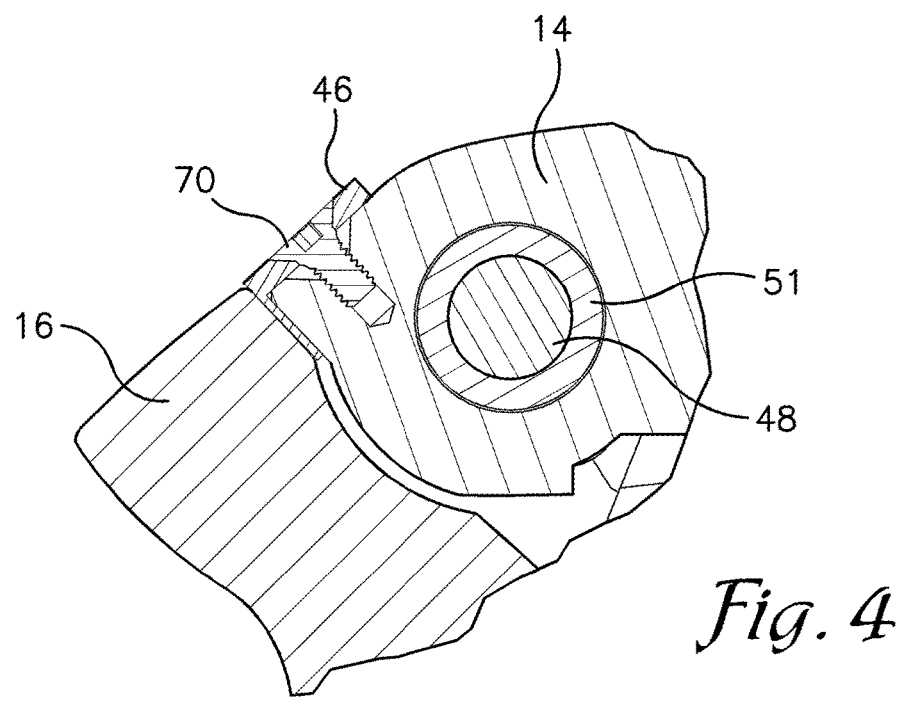
FIG. 4 is a cross-sectional view of an affixed shim between a base support structure and a shoulder support structure according to the present teachings.

FIG. 4 is a cross-sectional view of an affixed shim between a base support structure and a shoulder support structure according to the present disclosure. In various embodiments, the shim mounting fastener or screw 70 functions to hold in the shim 46 which acts to extend the hard stop associated with the base support 14. This shim can be made thicker or thinner to result in a varying narrowness of the tripod footprint. It is understood that the thicker the shim, the narrower the footprint of the tripod. The shoulder support 16 is caused to stop against the shim and hard stop of the base support 14. Shoulder bolt 48 and shoulder bushing 51 hold the shoulder support into place and allow the shoulder support to rotate against the hard stop and shimmed stop.

Figure 5:
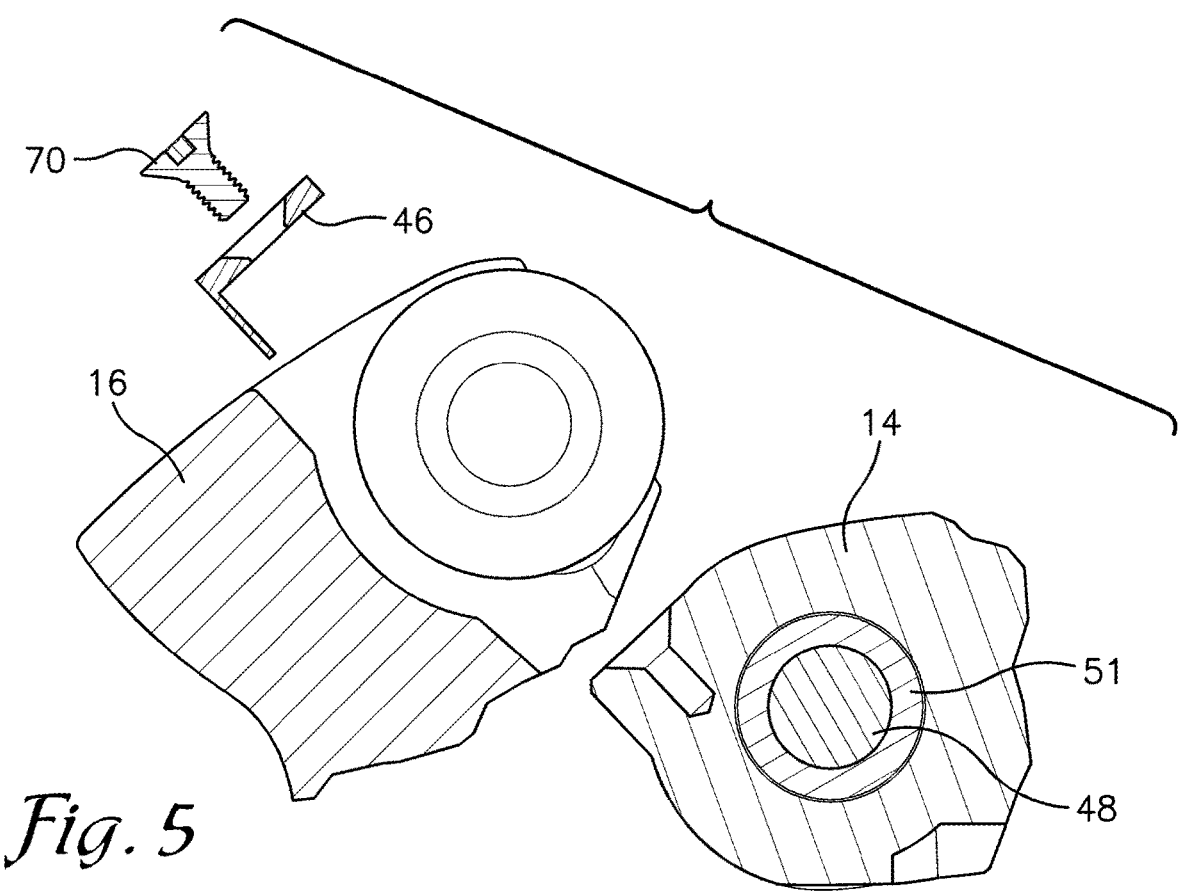
FIG. 5 is a cross-sectional view of an exploded shim between a base support structure and a shoulder support structure according to the present teachings.

FIG. 5 is a cross-sectional view of an exploded shim between a base support structure and a shoulder support structure according to the present disclosure. This figure shows the screw 70 and shim 46 exploded from the other parts described in connection with FIG. 4.

Figure 6:
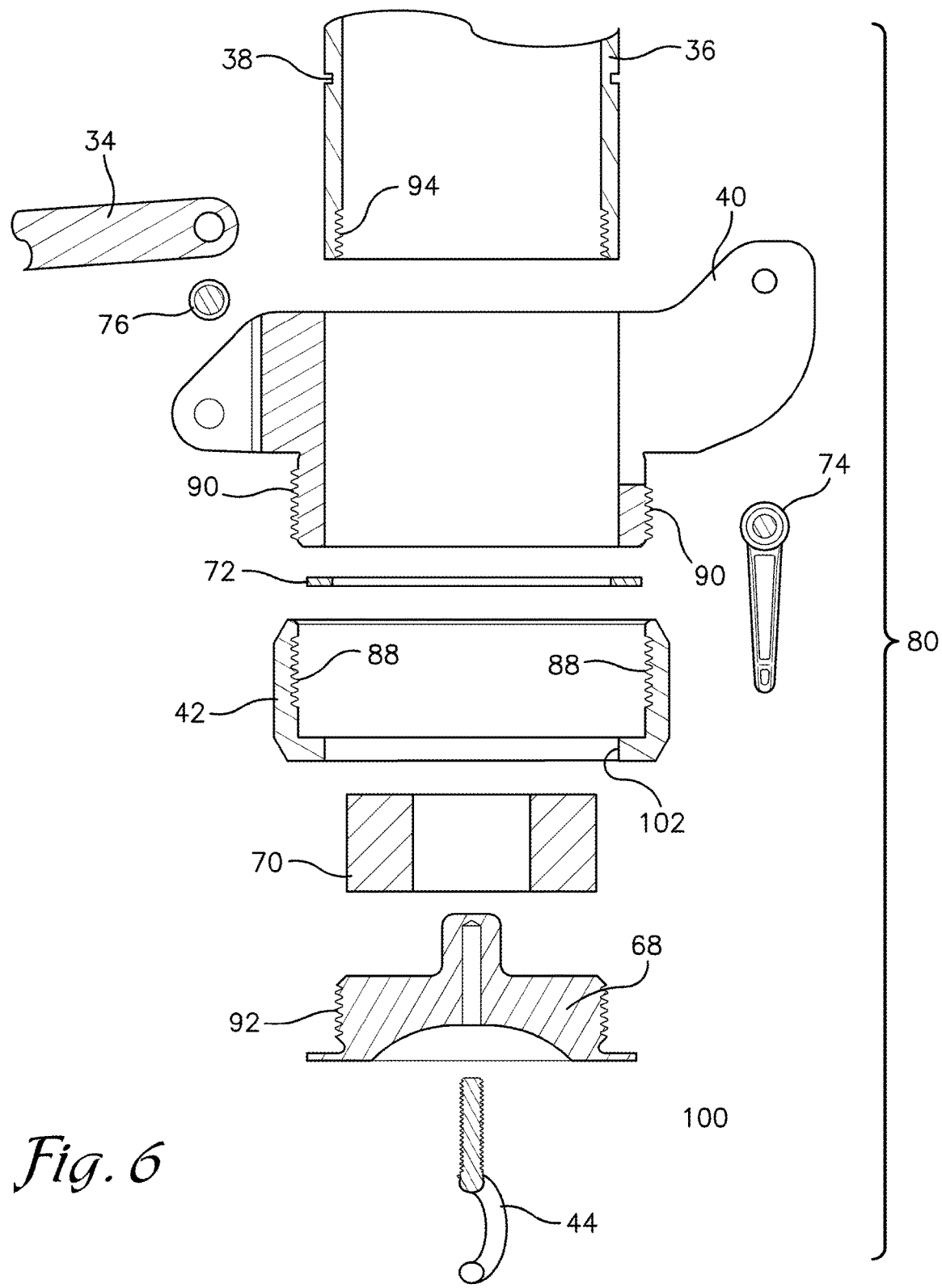
FIG. 6 is an exemplary cross-sectional view of an exploded clamping collar with corresponding mating structures according to the present teachings.

FIG. 6 is an exemplary, cross-sectional, exploded view of a center-column clamping assembly 80 with corresponding mating structures according to the present disclosure. In an embodiment, center column 36 is sized to fit within clamping collar 40 so that snap-ring grooves 38 can extend down through the clamping collar 40 allowing snap-ring 72 to fit with in one of the snap-ring grooves 38. In various embodiments, tensioning nut 42 with its own internal threads 88 can be tightened on exterior threads 90 on the clamping collar 40. As described in connection with FIG. 3, by tightening fastening nut 42 which itself is stopped by the snap-ring 72, as fastening nut 42 is tightened, the clamping collar 40 is drawn downwards this pushing out the struts 34, which are attached to the clamping collar 40 via a bushing and shoulder bolt 76.

In various embodiments, the center column clamp 74 is tightened to tighten the clamping collar 40 around the center column 36 to provide further friction and rigidity. It is understood that bushing/bolt combo 76 could be substituted for a bushing and a pin or similar mechanism. In various embodiments, a rubber donut 70 is provided to cushion a falling internal moving column 4 of FIG. 1. The operation of moving column 4 is further described in connection with FIGS. 7-9. As noted in connection with FIG. 1, a center column cap may be provided at the bottom end of the center column 36. In various embodiments, the center column cap 68 has an external thread 92 which can be threaded into an internal thread 94 of the center column 36. In various embodiments, lip 100 of the center column cap 68 is extended outwardly to prevent the tensioning nut 42 from becoming separated from the portable stand. For example, if the tensioning nut 42 is completely unthreaded from the clamping collar 40, it would otherwise fall to the ground, however in the embodiments, where the lip 100 is of a larger diameter than a bore 102 of the tensioning nut 42, then the tensioning nut 42 will be retained and supported from falling to the ground by the center column cap 68 if it is unthreaded from the clamping collar 40.

FIG. 7 is an exemplary perspective view of a moving column assembly 82. In various embodiments, the mounting ring 2 threads into the moving column 4. Rack thread portion 56 is used in connection with the ring gear 50 and rack lock 8 of FIG. 1, to both raise the moving column 4 and prevent it from going down respectively. A one-way check valve 60 allows air to rush out of the piston through the open cavity at the top of the moving column 4 when the moving column 4 is raised. Conversely, air is not allowed to back through the check valve 60 when the moving column is allowed to lower by way of gravity, and instead the air within the cavity of the center column 36 is allowed to pass slowly through a relatively smaller hole (not shown) in the center column 36. In various embodiments the exhaust hole is placed in the center column cap 68 or it can be at an alternative location in the center column 36. This allows the center column 4 to be raised quickly, while cushioning the fall when the column is allowed to be lowered by, for example, releasing the rack lock 8 of FIG. 1.

In various embodiments, the check valve 60 is threaded into center column cap 64, which itself is threaded into the bottom of the center column 4. O-rings 62 are placed into o-ring grooves 104 as can more clearly be seen in connection with FIG. 9.

FIG. 8 is an exemplary cross-section of the moving column assembly 82 at section a of FIG. 7.

FIG. 9 is an exemplary exploded view of assembly 86 of a base cap 64 at the base of the moving column 4, which provides a more detailed cross-sectional view of features of the check valve 60 and base cap 64.

Figure 10:
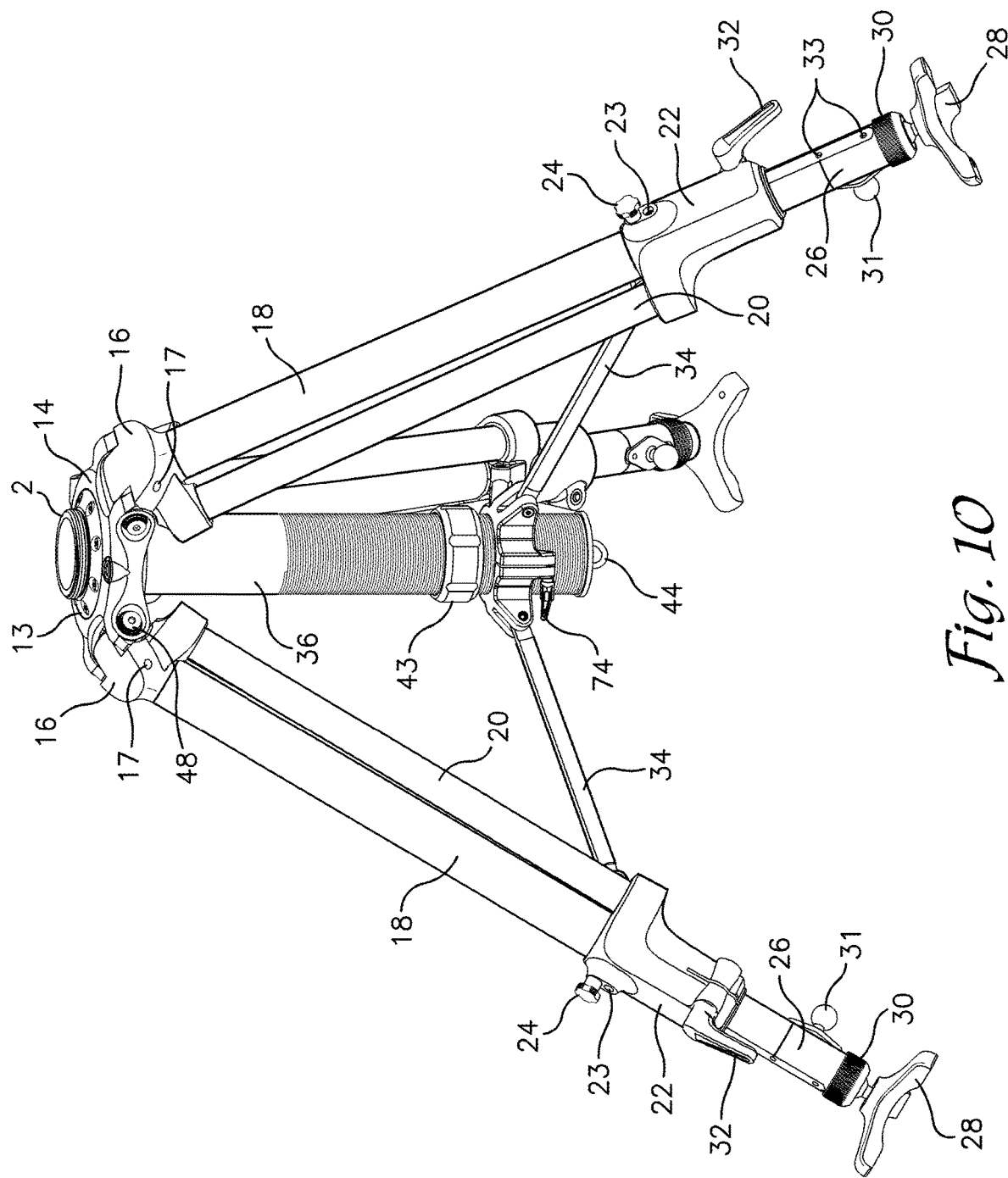
FIG. 10 is a perspective view of an alternative embodiment of a portable stand without a height-adjustable mounting ring, according to the present teachings.

FIG. 10 is a perspective view of an alternative embodiment of a portable stand without a height-adjustable mounting ring, according to the present teachings. Mounting ring 2 is used to mount a portable CMM such as a CMM arm or a laser tracker to a portable stand consistent with the present teachings. As noted in connection with FIG. 1, primary leg tubes 18 can be constructed from any light-weight rigid tubing such as carbon-fiber tubing or aluminum tubing. In various embodiments, the primary leg tube 18 is supplemented by an optional secondary leg tube 20 that can be incorporated to provide additional rigidity and stability. In various embodiments, multiples of optional secondary leg tube 20 are employed. For example, two leg tubes 20 can be rigidly mounted between the shoulder support 16 and a lower leg support 22.

Lower leg supports 22 are provided to connect extendable legs 26 with primary and secondary legs 18 and 20 respectively. The lower leg supports 22 can be made from a similar cast or injection molded material as upper and base supports 12 and 14. Secondary pressure knobs 24 are threaded into the lower leg supports 22 which prevent movement and wobble of the extendable legs 26. In various embodiments, a set screw can be provided in set-screw hole 23 which is adjusted to keep the extendable legs 26 from falling out. The flat surface of extendable leg 26 terminates inside the lower leg support 22 at a location that engages with the set-screw provided in set-screw hole 23 to prevent the leg from falling out when the secondary pressure knobs 24 are loosened. Accessory RAM mounts 31 can be attached to the legs 26 through holes 33 for supporting objects that can be connected to RAM mounts 31 such as cameras or motion detectors, etc. In alternative embodiments, rather than RAM mounts 31 being attached via the holes 33, other accessories can be attached such as adjustable-height wheels (not shown).

In various embodiments, foot collar clamps 30 are used to attach feet 28 to the extendable legs 26. Lower leg tightening knobs or levers 32 are used to tighten the extendable legs 26 into the lower leg supports 22.

Struts 34 are attached to a clamping collar 40. The clamping collar 40 is optionally tensioned around the center column 36. In various embodiments, the center column 36 is partially threaded as shown in FIG. 10. Corresponding screw threads 37 can be substantially full-depth threads where the tips of the threads are substantially sharp with the thread depth nearly as deep as the thread pitch value. Alternatively, the screw threads 37 can be partially or substantially truncated, so that the screw threads 37 are not at all sharp, and the final thread depth is only a fraction of the thread pitch value. Truncated threads have the benefit of being smoother and more robust to wear and tear. Moreover, the truncated threads have the benefit of working well in connection with a nut 43, which can optionally be a quick nut such as a conventional side adjust nut with a side-adjust push button that releases from the threads when the button is pushed. It is understood that the push-button can also be a pull-pin or a flange at the top of the nut that can be pulled out or pushed in to engage or release the quick nut. It will be understood that the screw threads 37 can standard thread pitch threads that work in connection with a standard nut or alternatively a quick nut that can be released from the threads and readily moved up or down before being re-engaged in the threads.

In an embodiment, an eyebolt 44 is threaded into the center column 36 (optionally by means of center column cap 68 as further described in connection with FIG. 6) so that additional weight can be hung from the eyebolt 44 thus further weighting down the tripod and rendering it more stable. In various embodiments, an adjustable hard stop is employed as more fully described below in connection with FIG. 12.

Figure 11:
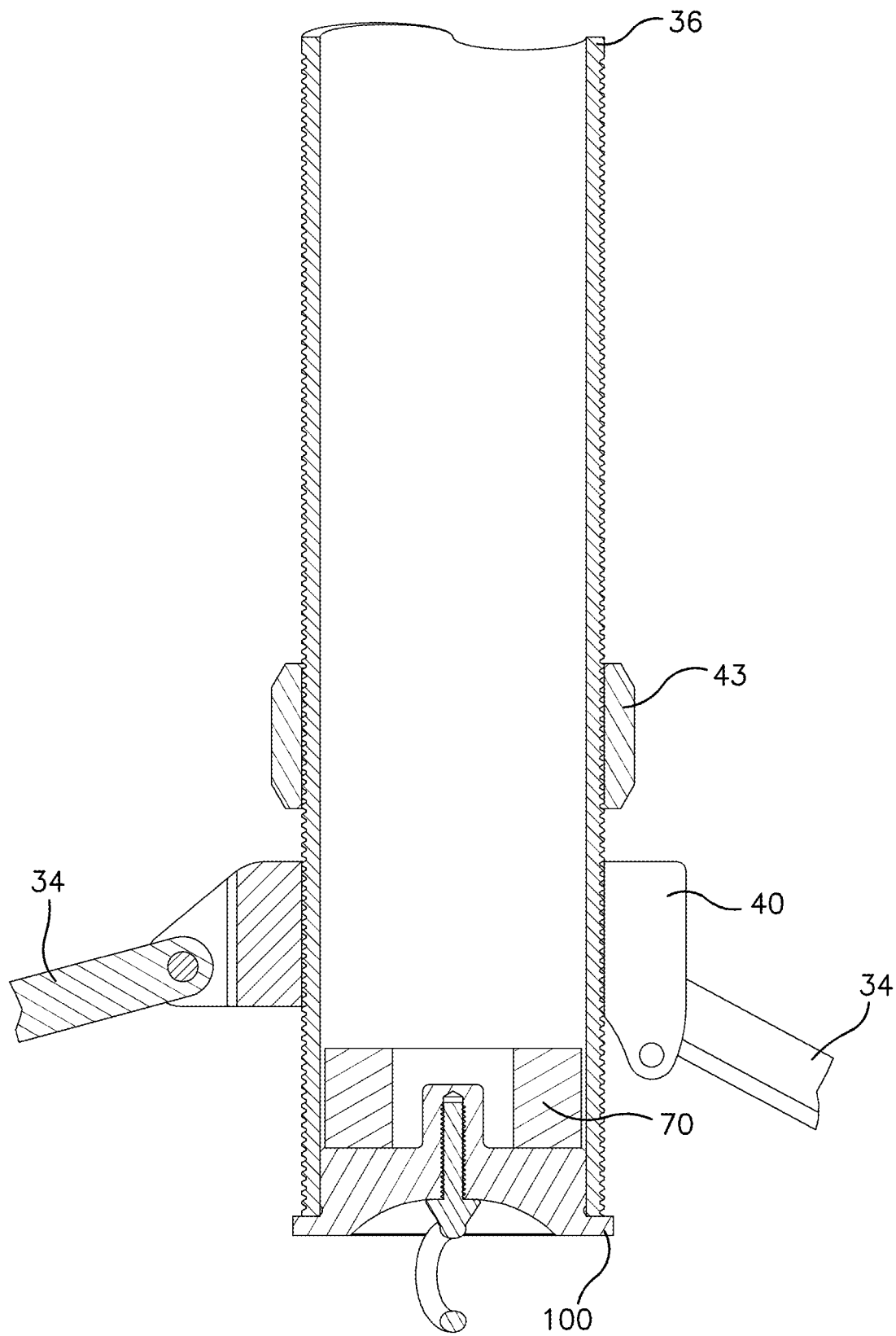
FIG. 11 is a cross-sectional view of a clamping collar on a center column according to the present teachings.

FIG. 11 is a cross-sectional view of a clamping collar 40 on a partially threaded center column 36 according to the present teachings. In this figure, it is shown how the strut 34 is connected to the clamping collar 40 and how nut 43 is threaded onto threads 37 in order to downwardly push on the clamping collar 40, thereby putting the struts 34 in compression and pushing outwardly on the legs of the portable stand to put them in compression with the hard stops described in connection with FIG. 12. It is not shown, but it is understood that the optional adjustable moving column with attached mounting ring mechanism (See FIG. 1) disclosed and explained herein can be employed with the exemplary embodiment of FIG. 10 in a way that is analogous to FIGS. 1 and 2.

Figure 12:
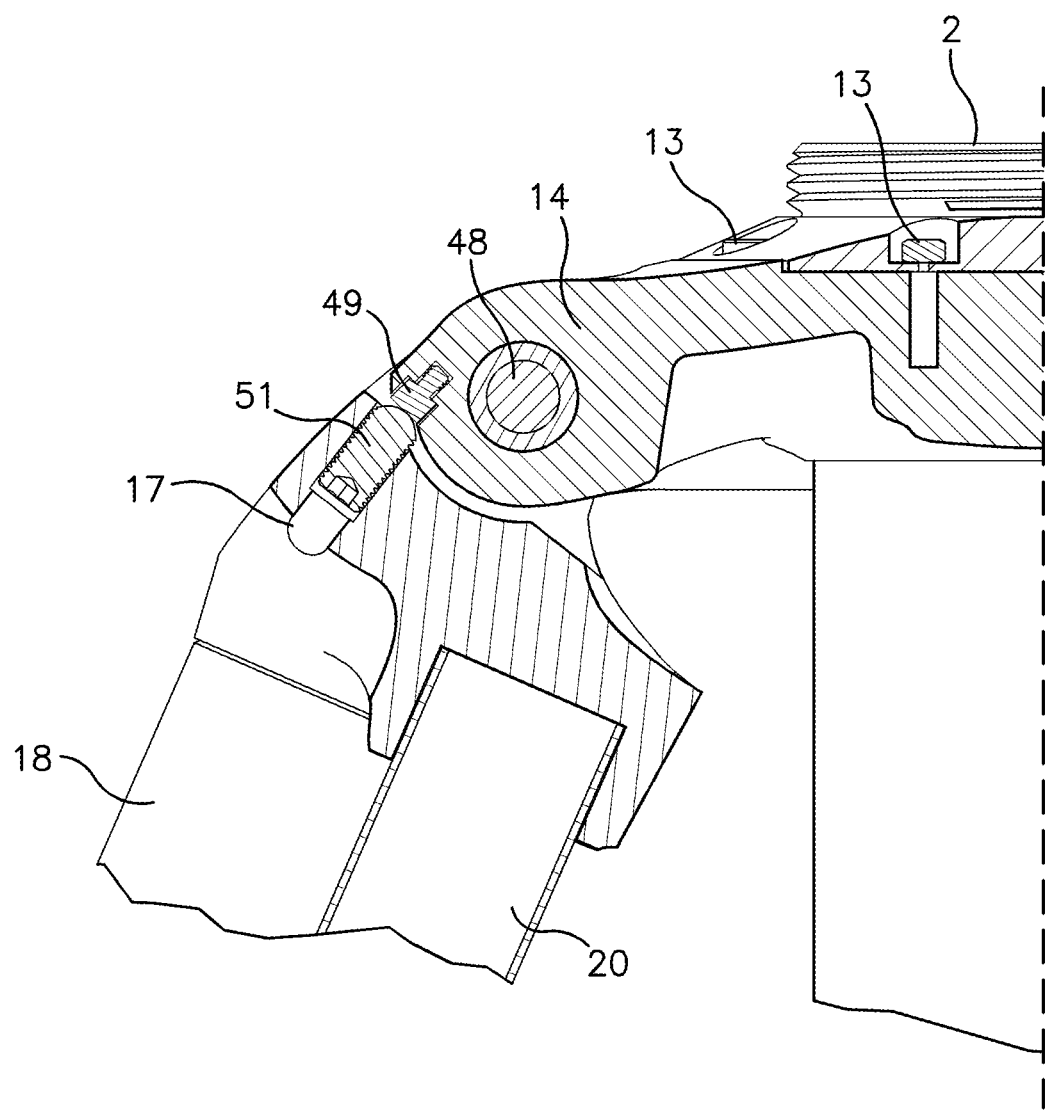
FIG. 12 is a cross-sectional view of base support 14 in communication with shoulder assembly 16.

FIG. 12 is a cross-sectional view of base support 14 in communication with shoulder assembly 16. As depicted in FIG. 10, shoulder assembly 16 optionally has a hard-stop set-screw hole 17. In various embodiments, a hardened, hard-stop resistance point 49 is provided that can be threaded or pressed into the base support member 14. In various embodiments, the base support member 14 is an aluminum casting with a hole machined (and optionally threaded) in it to receive the hard-stop resistance point, which is typically made from a material which is harder than the base support 14, for example steel or stainless steel but could be any other hard material. In an embodiment, rounded-end set-screw 51 is threaded into the shoulder member 16 either from the side closest to the base support 14 or through the set screw hole 17. In an embodiment, the set screw hole 17 is smaller than the set-screw 51 so that it must be threaded in from the side closest to the base support. It is understood that this approach has the advantage of preventing the set-screw 51 from falling out of the set screw hole 17 if the set screw is completely unscrewed. As shown in FIG. 12, the set-screw 51 has a recess for use in connection with a hex-headed "Allen" type wrench, but it will be appreciated that the set screw could be used in connection with a screw-driver or Torx or similar tool to tighten and loosen the set-screw 51, thereby increasing or decreasing the throw of the adjustable hard-stop and thereby decreasing or increasing the width of the stance of the tripod.

Figure 13:
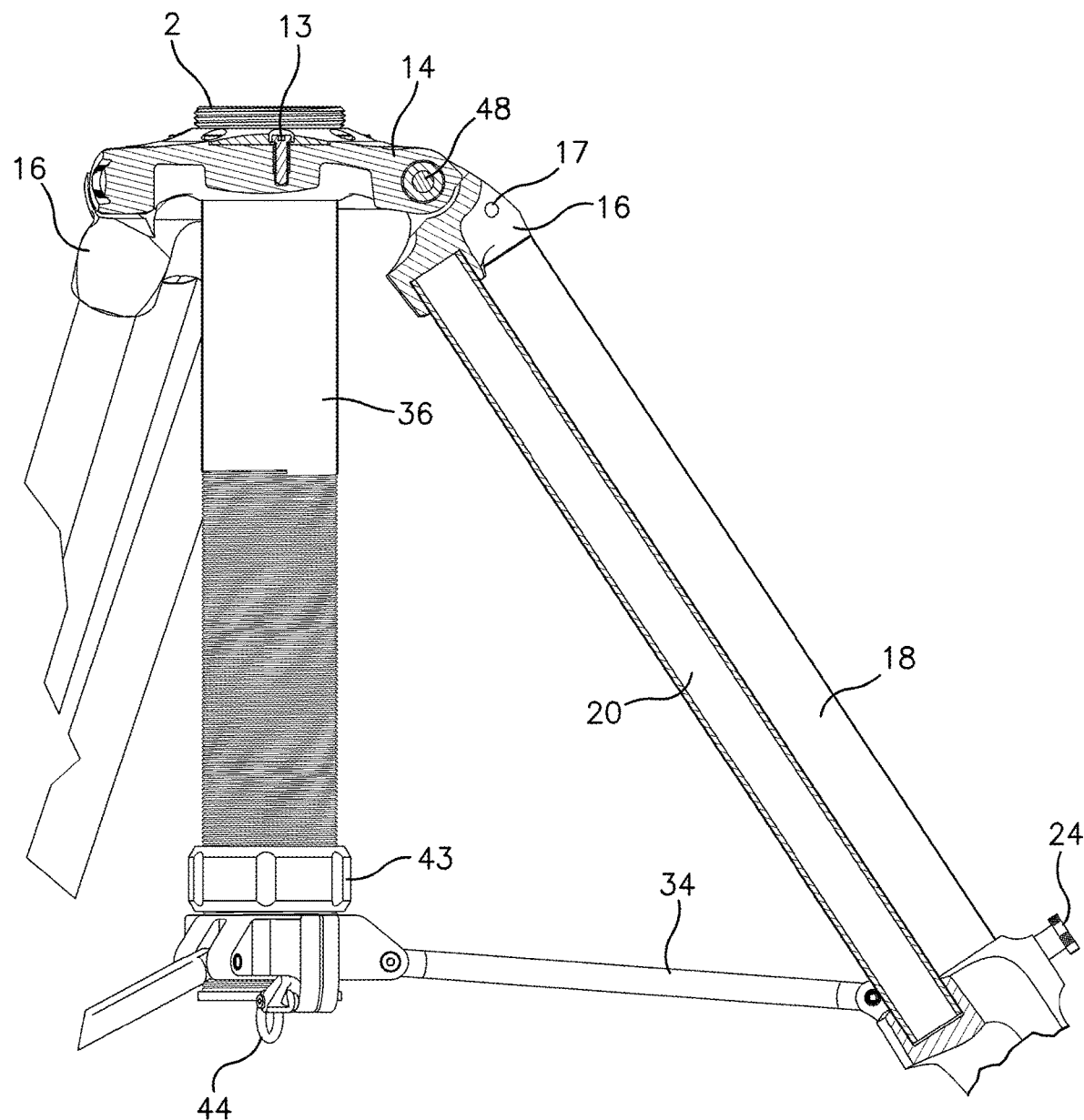
FIG. 13 is a cross-sectional view of an alternative embodiment of a portable stand without an adjustable hard stop.

FIG. 13 is a cross-sectional view of an alternative embodiment of a portable stand without an adjustable hard stop. The figure illustrates many of the exemplary components as described in connection with FIG. 10, however it is shown without the optional hardened, hard-stop resistance point 49 and adjustable hard-stop set-screw 51. In this embodiment, the material of base support 14 and shoulder mount 16 contact each other, and the portable stand does not have an adjustable hard stop and therefore does not have an adjustable stance. Nevertheless, by way of compression nut 43, the tripod can be put into rigid compression, even if there is some wear on the contact points between the base supports 14 and the collar mounts 16. As these contact points wear, the stance of the tripod will become incrementally wider, but the stand will still be able to be put into rigid compression. Accordingly, it is understood that the stand can still function as intended even in the absence of one or the other of the hard-stop resistance point 49 and adjustable hard-stop set-screw 51.

The design disclosed herein incorporates multiple features that provide the ability to use a measurement instrument on a tensioned tripod at multiple heights and accompanying diametric footprints even if the stand is well worn and has been used over and over in the field causing it to relax and change dimensions versus when it was new.

The present teachings disclosure embodiments that utilize a smooth center column that allows for a sliding clamping collar while also having one or more grooves in it for snap rings that are movable to change where the tensioning nut landing surface is positioned. A user can tension the tripod with the clamping collar to put pressure out on the struts. This is accomplished using a tensioning nut that pulls against the movable snap ring and down on the clamping collar. By putting multiple grooves in the center column and allowing the snap ring to move, this ensures that the tensioning nut always has enough travel to pull down on the clamping collar, applying pressure out to the struts and fully tension the tripod even if the tripod is heavily used and well worn. This is true even if there is not a shim installed on the hard stop, although the adjustable, shimmed hard stop allows the portable stand to be more versatile with a narrower or wider stance.

In these embodiments, a single hard stop surface would limit the number of angles the tripod can be opened to while still being under tension. By introducing a removable shim the number of angles now increases to the number of shim thicknesses that can be produced which can produce thousands of opening angles. If a narrower opening stance is desired a slightly thicker shim is employed. Conversely, if a wider stance is desired, a narrower shim is employed. The removable shim is used in combination with the tensioning nut at the bottom of the center column to ensure that the tripod is fully tensioned and at the extremes of any clearances in the shoulder joints or bushings thus producing the most rigid state possible.

As noted in connection with FIGS. 1 and 10, to produce an extremely rigid portable stand, a secondary pressure knob 24 is also be provided at to the lower leg casting. Once the lower leg casting is tightened on the extendable leg, the secondary pressure knob 24 is tightened, thus ensuring a high level of stability in the extendable leg.

In various embodiments, the optional adjustable hard stop assemblies enable a user of the metrology stands to change the angle of the legs to an arbitrary position before tightening the tensioning/compression nut on the center column to apply pressure at the struts and in turn compress the stand and remove slack in the joints and connections. This is desirable when using the tripod out in the field with a large variety of instruments in various conditions and job specific setups. Sometimes it is good to have a narrow base due to space constraints, and at other times more elevation is needed to look down (with a laser tracker or other metrology instrument) on a part or into a bore with the metrology instrument. At other times, it is important to have a lower, wider base for a heavy instrument or to avoid other obstacles on the ground, where the stand must be positioned.

Although the present teachings have been described with reference to various embodiments, this description is not meant to be construed in a limiting sense. Various modifications of the present teachings as well as further embodiments that omit aspects that have been described herein as exemplary or optional will be apparent to persons of ordinary skill in the art. It is therefore contemplated that the appended claims cover any such modifications or embodiments that fall within the scope of the present teachings.

What is claimed is:

1. A portable metrology tripod comprising:
   three upper leg tube assemblies rotatably attached by way of a shoulder member to a base support member;
   adjustable hard stops between the shoulder member and the base support structure that prevent the upper leg tube assemblies from rotating outwardly when the hard stops are engaged;
   a partially-threaded center column positioned between the upper leg tube assemblies being rigidly displaced from the center column by struts connected to a clamping collar surrounding the center column, wherein a tensioning nut is threaded downwardly onto an upper portion of the clamping collar, and wherein tightening of the tensioning nut results in driving the clamping collar downwardly thereby pushing bottom portions of the upper leg tube assemblies outwardly and compressing the adjustable hard stops thereby maintaining the upper leg tube assemblies in a state of compression between the struts and the adjustable hard stops.

2. The portable metrology tripod of claim 1, wherein the upper leg tube assemblies comprise three separate tubes rigidly positioned between the shoulder member and the lower leg support.

3. The portable metrology tripod of claim 1 further comprising telescoping extendable legs.

4. The portable metrology tripod of claim 1 further comprising swivel joint feet.

5. The portable metrology tripod of claim 1 further comprising sharp point feet.

6. The portable metrology tripod of claim 1 further comprising lower leg support structures that enable rigid extension of the telescoping legs.

7. The portable metrology tripod of claim 1, wherein the lower leg support structures that enable rigid extension of the telescoping legs comprise at least one secondary pressure knob threaded into the lower leg support.

8. The portable metrology tripod of claim 1, wherein the adjustable hard stops comprise at least one rounded-end set screw threaded into the shoulder member.

9. The portable metrology tripod of claim 7, wherein the adjustable hard stops further comprise at least one hardened hard-stop resistance point in the base support.

10. A portable metrology stand comprising:
    three primary leg tubes rotatably connected to a base support member that prevents the leg tubes from rotating outwardly, the base support structure being supported by a top portion of a partially-threaded center column positioned between the three leg tubes, the leg tubes being rigidly displaced from the center column by struts connected to a clamping collar surrounding the center column, wherein a compression nut is threaded downwardly onto an upper portion of the clamping collar, and wherein tightening of the compression nut results in driving the clamping collar downward thereby pushing bottom portions of the leg tubes outwardly and compressing the base support member against a shoulder member associated with each of the three legs, thereby maintaining the legs in a state of tension between the struts and a contact point between the base support member and the shoulder member.

11. The portable metrology stand of claim 10 further comprising telescoping extendable legs.

12. The portable metrology stand of claim 10 further comprising swivel joint feet.

13. The portable metrology stand of claim 10 further comprising sharp point feet.

14. The portable metrology stand of claim 10 further comprising lower leg support structures that enable rigid extension of the telescoping legs.

15. The portable metrology stand of claim 10, wherein the lower leg support structures that enable rigid extension of the telescoping legs comprise at least one secondary pressure knob threaded into the lower leg support.

16. A method for supporting a portable coordinate measuring machine with a portable tripod, the method comprising:
    providing three rigid leg tube assemblies that are rotatably attached to a base support member that prevents the leg tubes from rotating outwardly by adjustable hard stops between a shoulder member and the base support structure, the base support structure being supported by a top portion of a partially-threaded center column positioned between the three leg tube assemblies, the leg tube assemblies being rigidly displaced from the center column by struts connected to a clamping collar surrounding the center column;
    adjusting the adjustable hard stops to a desired stance of the tripod;
    correspondingly tightening a compression nut that is threaded downwardly onto an upper portion of the clamping collar, wherein the tightening of the tensioning nut results in driving the clamping collar downward thereby pushing bottom portions of the leg tubes outwardly and compressing the adjustable hard stops thereby maintaining the legs in a state of compression between the struts and the adjustable hard stops at the desired stance of the tripod.

* * * * *